United States Patent [19]

Schneider et al.

[11] Patent Number: 5,478,159
[45] Date of Patent: Dec. 26, 1995

[54] PRINTER SUCH AS A PRINTER FOR PRINTING SELF-ADHESIVE LABELS HAVING A CLUTCH

[75] Inventors: Peter Schneider, NeckargemUnd; Dirk Umbach, Hattingen, both of Germany

[73] Assignee: Esselte Meto International GmbH, Heppenheim, Germany

[21] Appl. No.: 311,258

[22] Filed: Sep. 22, 1994

[30] Foreign Application Priority Data

Sep. 24, 1993 [DE] Germany .................. 43 32 562.9
Sep. 24, 1993 [DE] Germany .................. 43 32 625.0

[51] Int. Cl.⁶ ............................................. B41J 33/14
[52] U.S. Cl. .................. 400/232; 400/234; 192/70.27; 192/56.1
[58] Field of Search ............. 192/54, 66, 70.11, 192/70.27, 56 R; 400/232, 236, 223, 225, 234

[56] References Cited

U.S. PATENT DOCUMENTS

| | | |
|---|---|---|
| 3,775,998 | 12/1973 | Century et al. . |
| 4,542,812 | 9/1985 | Westley . |
| 4,545,470 | 10/1985 | Grimm . |
| 4,651,165 | 3/1987 | Shimada ................................ 400/236 |
| 4,762,434 | 8/1988 | Hirano .................................. 400/232 |
| 5,138,335 | 8/1992 | Sugimoto et al. .................... 400/236 |
| 5,143,461 | 9/1992 | Inoue et al. .......................... 400/236 |
| 5,180,042 | 1/1993 | Ogiso . |
| 5,248,994 | 9/1993 | Yoshida et al. ...................... 400/232 |
| 5,322,148 | 6/1994 | Fernandez ........................... 192/70.27 |

FOREIGN PATENT DOCUMENTS

| | | |
|---|---|---|
| 711399 | 10/1941 | Germany . |
| 48116 | 5/1966 | Germany . |
| 6932536 | 8/1969 | Germany . |
| 1957244 | 2/1971 | Germany . |
| 2601221 | 8/1976 | Germany . |
| 4107289 | 9/1992 | Germany . |
| 4216912 | 11/1992 | Germany . |
| 878538 | 10/1961 | United Kingdom . |

Primary Examiner—Edgar S. Burr
Assistant Examiner—John S. Hilten
Attorney, Agent, or Firm—Nils H. Ljungman & Associates

[57] ABSTRACT

A printer having a spring-loaded print head which can be pressed against a counterpressure roller, wherein an active strand of a printing ribbon and a medium to be printed run between the print head and the counterpressure roller, can be configured such that the printing ribbon is unwound from a first spool and is wound up on a second spool, can preferably have a slip clutch disposed between the drive of the second spool and the second spool and/or between a drive and a drive roller in contact with the medium to be printed, and the slip clutch can be disposed in a wheel with a concentric shaft. Between the shaft and the wheel there can be at least one pair of axially spring-loaded friction discs. As an advantageous connection, the invention teaches that the wheel can be designed as an openable hollow body, that all the elements of the slip clutch are located inside the wheel, and that the shaft can be inserted into the slip clutch, whereby the at least one shaft-side friction disc can be connected to the shaft in an interlocking manner.

20 Claims, 5 Drawing Sheets

PRINTER SUCH AS A PRINTER FOR PRINTING SELF-ADHESIVE LABELS HAVING A CLUTCH

BACKGROUND OF THE INVENTION

1. Field of the Invention

The present invention generally relates to a printer, such as a printer for printing labels, such as self adhesive labels carried on a backing material. Such a printer can have a spring-loaded print head which can be pressed against a counterpressure roller, wherein an active strand of a printing ribbon and the medium to be printed can pass between the print head and the counterpressure roller. In such printers, the printing ribbon can typically be supplied by, and unwound from a first spool, and can be wound, or taken up by a second spool. In addition, between a drive and the take-up spool, and/or between a drive and a drive roller in contact with the medium to be printed, there can also be a slip clutch which can be located in a wheel with a concentric shaft, to which shaft a torque is transmitted. Such a friction clutch can typically have at least one pair of axially spring-loaded friction discs interposed between the shaft and the wheel.

2. Background Information

On printers, e.g. on thermal transfer printers, it has been found to be necessary to use a slip clutch to limit the torque which is exerted on the spool on which the used ink ribbon (thermal transfer ribbon) is wound up. The slip clutch can thereby prevent an unacceptably high tensile stress on the ribbon. Such an unacceptably high tensile stress could occur, for example, if the spool from which the ribbon is unwound is stopped for any reason, in which case the ribbon can stop moving suddenly. In such a case, one manner for preventing the ribbon from tearing is to use a slip clutch.

To achieve the correct feed, it may also prove necessary to transport the medium being printed, e.g. for printing individual labels, with a separate drive roller instead of, or in addition to the counterpressure roller. Here again, in particular in the case of a malfunction, it can generally be necessary to limit the drive moment exerted by the drive roller, to prevent damage to the drive motor or to other mechanical elements.

Known slip clutches are very common, and, for example, have been configured in the form of multiple-disc clutches. When the torque exceeds a predetermined value which can be defined by the selection of both the friction pair and the force of the spring or springs used, the adhesive friction can be overcome and the clutch can slip. In the extreme case, for example, only the drive shaft continues to rotate, while the wheel remains stationary, or vice-versa.

One such known clutch must be assembled on the shaft piece-by-piece. If the slip clutch in question is very small, and its components are consequently also very small, the assembly becomes a tedious and time-consuming operation. Further, if this shaft with the clutch is to be used in a machine where there is not much space available, the operations of servicing and repairing this clutch, e.g. replacing the friction discs, can be particularly time-consuming and consequently expensive. During these service and repair operations, moreover, it is possible for one of the small friction discs or other pieces to fall into the machine, thereby possibly causing a disruption of operation of the entire machine.

OBJECT OF THE INVENTION

The object of the present invention is therefore to improve a printer of the type described above so that the slip clutch has a simple design, occupies relatively little space, and is easy to install and remove. Naturally, it should also be possible to manufacture this clutch economically.

SUMMARY OF THE INVENTION

The present invention teaches that this object can be achieved if the printer described above has a slip clutch located in a wheel with a concentric shaft, to which shaft a torque is transmitted, and wherein, between the shaft and the wheel, there can preferably be at least one pair of axially spring-loaded friction discs, characterized by the fact that the wheel is preferably designed as an openable hollow body, that all the elements of the slip clutch are preferably located inside the wheel, and that the shaft can be inserted into the slip clutch, whereby at least one shaft-side friction disc can be connected to the shaft in an interlocking manner.

In the scope of the present invention, the term "wheel" is meant to be interpreted in its broadest sense. In other words, the term "wheel" can essentially refer very generally to a body which can be mounted so that the body can rotate on a shaft, which body defines a geometric axis that coincides with a geometric axis of the shaft. Further, each pair of friction discs can preferably have one friction disc connected non-rotationally to the shaft and one friction disc connected non-rotationally to the wheel. Each of the two friction discs, of a pair of friction discs, can typically have different coefficients of friction, at least with regard to their surfaces in contact with one another. Also, either the wheel, or the shaft can be connected directly, or indirectly to the drive motor. In particular, the shaft can be connected to the spool to wind up the ribbon.

The wheel can preferably be configured as an openable hollow body, which can preferably simultaneously form the housing of the slip clutch to contain all the elements of the clutch, i.e. all the friction discs and the load spring or springs, whereby the springs can be loaded, or stressed, when the hollow body is closed. If that is the case, the slip clutch can be completely pre-assembled separately from the shaft. Essentially all that would then be necessary would be to centrally insert the shaft into this slip clutch, whereby the interlocking connection between the shaft and the shaft-side friction disc, or discs, can be made automatically when the shaft is inserted. Naturally, that presupposes that the shaft and the shaft-side friction disc, or discs, have a pre-determined direction of rotation during the assembly process.

But actual practice has shown that this is not a problem at all. Therefore, such a slip clutch can essentially be installed in any machine in which space is at a premium. The same is true for the removal of the slip clutch, so that repairs, in particular the replacement of the friction discs or springs, can be performed outside the machine, thereby essentially eliminating the danger that parts of the friction clutch will fall into the machine. Meanwhile, the shaft can preferably remain in the machine, and could in actuality be an essentially non-removable part thereof.

In an alternative embodiment, the shaft and the shaft-side friction disc, or discs, can preferably have matching, non-round cross sections. As such the interlocking connection between the shaft and the shaft-side friction disc, or discs, can be accomplished essentially merely by inserting the shaft into this slip clutch. Essentially no other measures or adjustments would then be necessary. In this case, a "non-round" cross section is used to designate any cross section shape which is not a complete circular shape. Thus, the cross section could be bordered at least partly by a circular arc. Alternatively, the cross section of the shaft and shaft side friction disc, or discs, would not need to match completely, but only segmentally. For example, if the cross section in question is a rectangular shaft cross section, the cross section of the corresponding hole in the friction disc or discs can also be an octagon.

In terms of ease of manufacturing, a particularly simple cross section can essentially be achieved by somewhat flattening the shaft on one side, and defining the hole accordingly in the form of a circular arc and a chord which connects the ends of the arc. Naturally, the diameter of the circle thereby equals the full diameter of the shaft.

Therefore, if the interlock between the shaft and the shaft-side friction discs of each pair of friction discs is accomplished by the angular orientation and subsequent insertion of the shaft, there should preferably be an alternative manner in which to non-rotationally connect the wheel-side friction disc to the hollow body. This alternative non-rotational connection should also be relatively simple to make.

One such type of connection could preferably be provided by providing at least one, and preferably at least two peg/hole connections between the hollow body and the wheel-side friction disc. In other words, either the wheel-side friction disc or the hollow body could have at least two projections, which can be engaged in corresponding recesses of the other of the wheel-side friction disc and the hollow body. Each wheel-side friction disc, i.e. the friction disc to be connected non-rotationally to the wheel, and which forms the other half of the friction pair, can thereby be non-rotationally connected by means of an axial insertion movement to the wheel or hollow body, whereby it is appropriate if the number of pegs and the number of holes in each peg-hole connection are equal. Of course, even with this slip clutch, the shaft-side and wheel-side friction discs must each have approximately equal dimensions, as is generally known by those skilled in the art.

In an additional configuration of the invention, each wheel-side friction disc can preferably have two holes, offset from one another by about 180 degrees and oriented concentric to a central hole, to thereby provide for the peg-hole connection. Accordingly, the corresponding pegs would be located on the wheel. The matching friction disc could then be inserted over the pegs to form the non-rotational connection between the wheel and the wheel-side friction disc.

In a particularly preferred variant of the invention, the hollow body can be formed by an essentially cup-shaped base element and a cover. As such, the cover could preferably close the "cup" in the vicinity of the open end of the cup. It is thereby possible to have a compact unit and, at the same time, a protected installation for the pair of friction discs.

The pegs of the above-described peg-hole connections on such a hollow body can very advantageously be located internally, and preferably on the bottom of the cup and on the inside of the cover.

An additional embodiment of the invention provides that there be preferably one wheel-side friction disc disposed preferably adjacent each of the bottom of the cup and the cover, with two shaft-side friction discs between the two wheel-side friction discs. As such, a biasing member, such as a load spring, could preferably be disposed between the two shaft-side friction discs. After inserting the components into the base body, the installation of the cover on the cup-shaped base body could then simultaneously compress the load spring between the two pairs of friction discs. With such a configuration, the spring tension could be increased, e.g. by inserting at least one additional disc between at least one of the two ends of the spring and the corresponding adjacent friction disc.

As noted several times above, this slip clutch can also be used if the wheel is connected to the drive and the shaft represents a driven shaft. In this case, it would then be particularly advantageous if the cup cover were provided with external gear teeth. A corresponding toothed belt could then be used to form the interlocking connection between the base body serving as the wheel for the take-up spool, and an additional wheel, which would then also preferably have gear teeth on the outside, which would be driven by the drive motor. An external collar on the base body could also preferably be provided to secure this belt in the axial direction. A configuration with a pulley headwheel, that is, with two external collars, one each at the top and bottom of the wheel, could also be conceivable.

So that the load spring can transmit its force uniformly to the pairs of friction discs, an additional configuration of the present invention teaches that the load spring preferably concentrically surrounds a centering bushing, through which centering bushing, the shaft can preferably be centrally inserted.

It is of particular advantage both for the installation operation and for the repair or maintenance of the slip clutch that the cup-shaped base body preferably be detachably connected to the cover by means of a bayonet-like connection. Such a connection can alternatively be described as a connection which is afforded by first inserting one part onto, or into another, and then relatively rotating the two parts so that the connection locks. By opening the bayonet-like connection, the cover can be removed, i.e. when the bayonet is opened, the cover can preferably automatically be raised axially by the force of the load spring.

On the other hand, no special tools are required for the installation of the cover. All that is essentially necessary is to make sure that the cover is placed on the shaft, with a simultaneous compression of the load spring, in a slip-on position, suitable for the subsequent rotation, which rotation would lock the cover in place. In addition, the bayonet connection must also be configured so that it cannot be loosened by the force of the spring. In other words, a simple rotation of the cover should preferably not be sufficient for removal thereof, as such a rotation would essentially be occurring during frictional engagement of the disc pairs during use. Instead, if the bayonet-like connection is opened, the connection should preferably be configured so that the cover would first have to be pushed in somewhat against the resistance of the load spring, and then rotated by the necessary amount. With the support of the spring, the cover could then be removed axially.

The special configuration of the bayonet-like connection results from the fact that, on the edge of the cup of the base body, there can preferably be several tabs which can be distributed uniformly over the circumference, and which tabs project radially inward. Also, the cover, in its peripheral area, can preferably have at least a corresponding number of approximately equal-sized peripheral notches, so that the cover can be inserted into the base body by sliding the tabs through the notches. In a preferred embodiment, both the peripheral notches and the tabs of the base body can preferably have a somewhat rectangular shape.

An additional embodiment of the present invention is characterized by the fact that on the external surface of the cover, between each two peripheral notches, there can preferably be at least one locking depression, or snap-in notch, which can have a depth, for example, of about half of the thickness of the cover. Thus, upon rotation of the cover within the base body, the force of the spring can solidly engage the tabs within the locking depressions so that a simple turning of the cover is essentially not possible without also turning the base body therewith. These locators make possible a non-rotational engagement of the base body tabs, and thereby a secure closing of the housing of the slip clutch. The depth of the locking depressions can preferably be selected so that the outside of the cover is preferably flush with the base body.

One appropriate refinement of the invention in this regard is characterized by the fact that at least two sets of locking depressions can be made on the cover, offset from one another by some angular distance, whereby the number of locking depressions is a whole-number multiple of the number of tabs on the base body, and that one group of locking depressions, viewed in the axial direction of the clutch, has a depth into the cover which is greater than the depth of the other group, or any other group. This arrangement makes it possible to change the spring tension particularly quickly and easily, if necessary, and without the use of any special tools, simply by turning the cover from a first set of depressions in engagement with the tabs to another set of depressions in engagement with the tabs. In alternative terms, the shallower tabs will compress the spring to a greater extent than will the deeper tabs, and thus a rotation of the alignment from the shallow tabs to the deeper tabs will reduce the spring tension. This type of adjustment also essentially allows for an adjustment of the maximum torque to be transmitted by the slip clutch. Above all, the slip clutch need not be opened for this purpose. Rather, all that is necessary would preferably be to rotate the cover, starting from an initial locked position, by a specified angle, e.g. 30 degrees, on the shaft, and then to snap it once more into engagement with the base body.

In summary, one aspect of the invention resides broadly in a printer for printing labels on a label material by transferring a printing substance from a printing ribbon to the label material, the printer comprising: apparatus for storing label material to be printed upon; apparatus for storing printing ribbon, the printing ribbon comprising a printing substance thereon; at least one printing element for transferring the printing substance from the printing ribbon to the label material; apparatus for feeding the printing ribbon past the at least one printing element; apparatus for taking-up printing ribbon fed past the at least one printing element; apparatus for driving the take-up apparatus to take-up printing ribbon fed past the at least one printing element; slip clutch apparatus disposed between the apparatus for driving and the take-up apparatus; the slip clutch apparatus comprising: shaft apparatus, the shaft apparatus comprising apparatus for being connected to one of: the drive apparatus, and the take-up apparatus; the shaft apparatus being disposed for movement along with the connected one of the drive apparatus and the take-up apparatus; housing apparatus disposed about the shaft apparatus, the housing apparatus comprising apparatus for being connected to the other one of: the drive apparatus, and the take-up apparatus; the housing apparatus being disposed for movement along with the connected one of the drive apparatus and the take-up apparatus; apparatus for frictionally engaging the shaft apparatus with the housing apparatus for moving the shaft apparatus with the housing apparatus, the apparatus for frictionally engaging being disposed within the housing apparatus; and the housing apparatus surrounding at least a substantial portion of at least the apparatus for frictionally engaging.

Another aspect of the invention resides broadly in a slip clutch in a printer for printing on a material by transferring a printing substance from a printing ribbon to the material in a printing area of the printer, apparatus for feeding the printing ribbon through the printing area of the printer, apparatus for taking-up printing ribbon fed through the printing area; apparatus for driving the take-up apparatus to take-up the printing ribbon fed through the printing area; slip clutch apparatus disposed between the apparatus for driving and the take-up apparatus; the slip clutch apparatus comprising: shaft apparatus, the shaft apparatus comprising apparatus for being connected to one of: the drive apparatus, and the take-up apparatus; the shaft apparatus being disposed for movement along with the connected one of the drive apparatus and the take-up apparatus; housing apparatus disposed about the shaft apparatus, the housing apparatus comprising apparatus for being connected to the other one of: the drive apparatus, and the take-up apparatus; the housing apparatus being disposed for movement along with the connected one of the drive apparatus and the take-up apparatus; apparatus for frictionally engaging the shaft apparatus with the housing apparatus for moving the shaft apparatus with the housing apparatus, the apparatus for frictionally engaging being disposed within the housing apparatus; and the housing apparatus surrounding at least a substantial portion of at least the apparatus for frictionally engaging.

A further aspect of the invention resides broadly in a method of operating a printer for printing on a material by transferring a printing substance from a printing ribbon to the material in a printing area of the printer, the printer comprising: apparatus for feeding the printing ribbon through the printing area of the printer, apparatus for taking-up printing ribbon fed through the printing area; apparatus for driving the take-up apparatus to take-up the printing ribbon fed through the printing area; and slip clutch apparatus disposed between the apparatus for driving and the take-up apparatus; the slip clutch apparatus comprising: shaft apparatus, the shaft apparatus comprising apparatus for being connected to one of: the drive apparatus, and the take-up apparatus; the shaft apparatus being disposed for movement along with the connected one of the drive apparatus and the take-up apparatus; housing apparatus disposed about the shaft apparatus, the housing apparatus comprising apparatus for being connected to the other one of: the drive apparatus, and the take-up apparatus; the housing apparatus being disposed for movement along with the connected one of the drive apparatus and the take-up apparatus; apparatus for frictionally engaging the shaft apparatus with the housing apparatus for moving the shaft apparatus with the housing apparatus, the apparatus for frictionally engaging being disposed within the housing apparatus; and the housing apparatus surrounding at least a substantial portion of at least the apparatus for frictionally engaging, the method comprising the steps of: providing a printer for printing on a material by transferring a printing substance from a printing ribbon to the material in a printing area of the printer; providing apparatus for feeding the printing ribbon through the printing area of the printer; providing apparatus for taking-up printing ribbon fed through the printing area; providing apparatus for driving the take-up apparatus to take-up the printing ribbon fed through the printing area; and providing slip clutch apparatus between the apparatus for driving and the take-up apparatus; the providing of the slip clutch apparatus comprising the steps of: providing shaft apparatus as a component of the slip clutch; connecting the shaft apparatus to one of: the drive apparatus, and the take-up apparatus; disposing the shaft apparatus for movement along with the connected one of the drive apparatus and the take-up apparatus; providing housing apparatus as a component of the slip clutch; disposing the housing apparatus about the shaft apparatus; connecting the housing apparatus to the other one of: the drive apparatus, and the take-up apparatus; disposing the housing apparatus for movement along with the connected one of the drive apparatus and the take-up apparatus; providing apparatus for frictionally engaging the shaft apparatus with the housing apparatus; disposing the apparatus for frictionally engaging within the housing apparatus; and surrounding at least a substantial portion of at least the apparatus for frictionally engaging with the housing apparatus; and the method further comprising the steps of A, B, C, D, E and F: A) feeding printing ribbon through the printing area of the printer; B) frictionally engaging the shaft apparatus with the housing apparatus; C) driving one of: the shaft apparatus and the housing apparatus to drive the frictionally engaged other of the shaft apparatus and the housing apparatus to take-up ribbon fed through the printing area; and subsequent to steps A, B and C performing the steps of D, E and F: D) inhibiting feed of printing ribbon through the printing area of the printer; E) interrupting the frictional engagement between the shaft apparatus and the housing apparatus to relatively rotate the shaft apparatus and the housing apparatus with respect to one another; and F) stopping take-up ribbon by the take-up apparatus.

BRIEF DESCRIPTION OF THE DRAWINGS

The invention is explained in greater detail below with reference to the accompanying drawings, in which.

DESCRIPTION OF THE PREFERRED EMBODIMENTS

Figure 1:
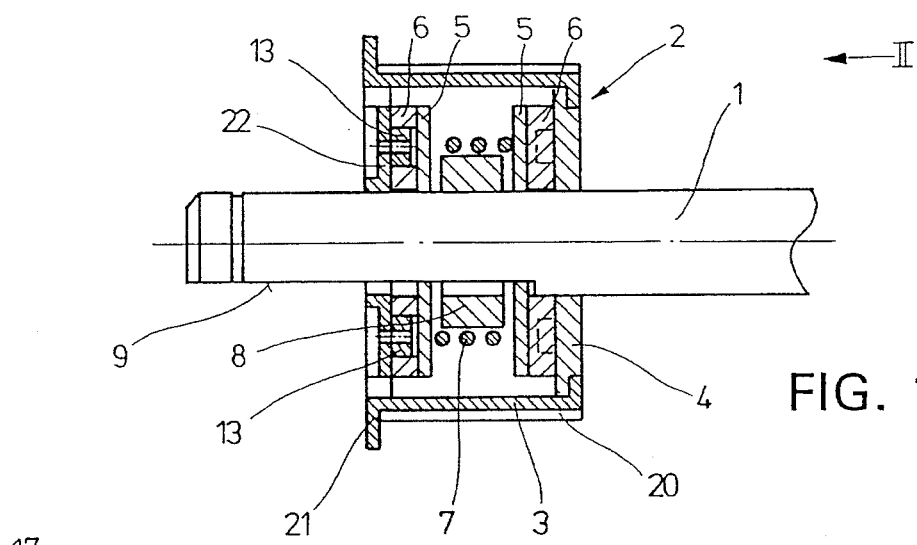
FIG. 1 is a longitudinal center section through the slip clutch with an installed shaft.

In a printer, such as a printer which uses an ink ribbon to provide printing on labels, a slip clutch can preferably be used to transmit a torque from a driven shaft 1 to a wheel 2, or vice-versa from a driven wheel 2 to a shaft 1, as represented in FIG. 1. In essence, such a slip clutch could also be used in many other fields as well. With regard to use in a printer, such an application is explained below in greater detail with reference to FIGS. 10 and 11.

For a slip clutch, in general, a wheel 2 would preferably be oriented concentrically to a shaft 1 or, as in the embodiment, the shaft 1 can run through the center of the wheel 2. As discussed earlier, the term "wheel", as used in the following description, is used in the broadest sense. In the depicted embodiment, the wheel 2 is a rotationally-symmetrical hollow body which is preferably formed by a cup-shaped base body 3 and a cover 4. In the embodiment, inside the wheel 2 or hollow body, there are preferably two pairs of axially spring-loaded friction discs 5 and 6, one of which, namely the shaft-side friction disc 5, is preferably non-rotationally connected to the shaft 1, while the other friction disc of each pair of friction discs, namely the wheel-side friction disc 6, is preferably non-rotationally connected to the cover 4 or the base body 3.

The friction discs 5, 6 of each pair of friction discs are preferably pressed together by means of a resilient member such as spring 7, which spring 7 can preferably be a coil compression spring and can surround the shaft 1 concentrically. In the depicted embodiment, there is also shown a centering bushing 8 inside the coil compression spring 7 to ensure a centering of the spring 7 about the shaft 1, and thereby provide an essentially equal distribution of the spring force about the friction discs 5, 6. Depending on the configuration, i.e. the diameter of the discs 5, 6, the shaft 1, and the spring 7, it might be conceivable that such a bushing 8 would not be necessary.

Figure 3:
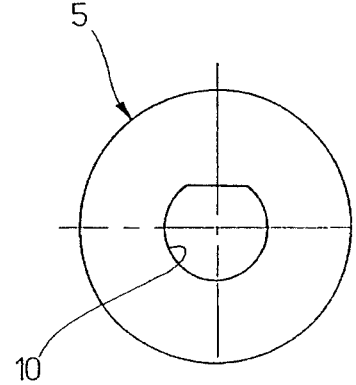
FIG. 3 is a view of a shaft-side friction disc.

The shaft 1 can preferably be provided on its outer end with a flattened portion 9 so that the shaft 1 can rotationally engage the friction discs 5. For this reason, as shown in FIG. 3, a central hole 10, of the friction discs 5, is preferably not circular, and is preferably bounded by a circular arc and a chord, to essentially match the configuration of the flattened portion 9 of the shaft 1. Thus the shaft-side friction disc 5 can be pushed onto the shaft 1 essentially only in one angular position. But on the other hand, the shaft-side friction disc 5, once pushed onto this shaft 1 would be non-rotationally connected to the shaft 1 and thereby basically follow any rotational movement of the shaft 1.

Figure 5:
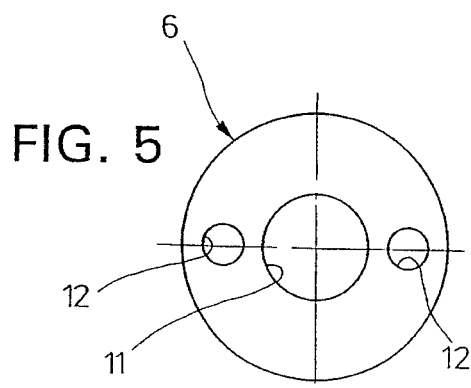
FIG. 5 is a view of a wheel-side friction disc.

The wheel-side friction discs 6, on the other hand, are also preferably held non-rotationally, but to the wheel, or base body 2. As illustrated in FIG. 5, the discs 6 preferably have a central hole 11 which is preferably designed as a circular hole with a diameter which substantially corresponds to the full diameter of the shaft 1 so that the shaft 1 is preferably freely rotatable therewithin. Offset from one another by 180 degrees, or opposite one another are preferably two additional holes 12, which can preferably be smaller in diameter than the central hole 11, and disposed concentrically to the hole 11. Each hole 12 can preferably form one part of a peg-hole connection for the non-rotational retention of the wheel-side friction disc 6.

Figure 2:
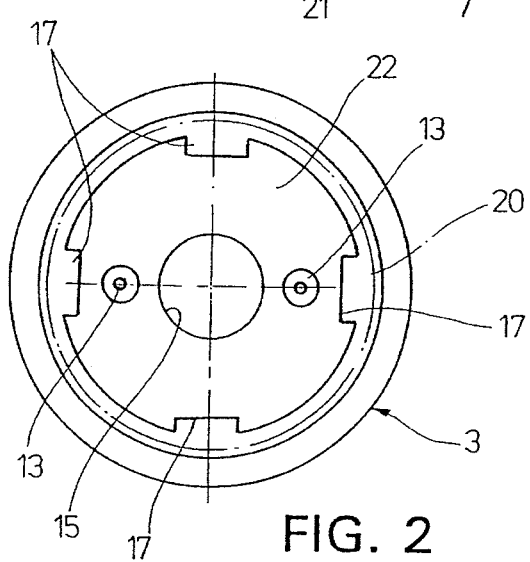
FIG. 2 is a view of the hollow body base body, in the direction indicated by the Arrow II in FIG. 1.

As shown in FIGS. 2 and 3, a peg 13, 14 corresponding to each hole 12, can be located either on the bottom 22 of the cup-shaped base body 3 or on the inside of the cover 4, respectively. Preferably, the pegs 13 can be manufactured so that they are one piece with the bottom 22 of the cup. The same can preferably be true for the pegs 14 of the cover 4. There can also preferably be a central hole 15 or 16 in the bottom 22 and in the cover 4, respectively, the cross section of which preferably essentially equals the full cross section of the shaft 1, again, so that the shaft 1 can rotate therewithin.

The cover 4 can be connected to the cup-shaped base body 3 by means of a bayonet-type connection, namely in the vicinity of the edge of the cup. Such a bayonet-type connection would essentially be understood to be any type of connection which is brought about by a simple insertion of one part into another, followed by a relative rotation of the parts so that the inserted part can not be withdrawn without first rotating the parts. To provide such a connection, in the depicted embodiment as illustrated by FIG. 2, there can preferably be four tabs 17 pointing radially inwardly and distributed uniformly on the circumference of the base body 2.

Figure 4:
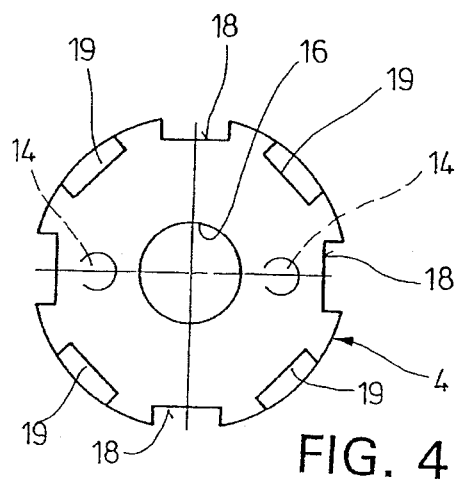
FIG. 4 is a plan view of the outside of the cover of the hollow body.

As illustrated in FIG. 4, the cover 4 can then preferably have four correspondingly-oriented and sized notches 18 in the edge thereof. As such, in an appropriate angular orientation, the cover 4 can be pushed past the tabs 17 into the inside of the hollow body, whereby the springs 7 would be compressed and the pairs of friction discs 5, 6 would be pressed firmly against one another. If, in the first embodiment, the cover 4 were then to be turned by about 45 degrees and released, the spring 7 would preferably push the cover 4 from below against the inside of the tabs 17. So that this angular position can be located and maintained securely, as shown in FIG. 4, on the outside surface of the cover 4 there can preferably be four locking depressions 19 also offset from one another by about 90 degrees and oriented somewhat centrally with respect to the peripheral notches 18. These depressions 19, for example, could possibly have a depth of about ½ of the thickness of the cover 4. Further, the depth of the notches should preferably be the same as the thickness of the tabs 17 so that, as shown in FIG. 1, the outer surface of the cover 4 can essentially be disposed in alignment with the end surface of the base body 2. The shape of these locking depressions 19 can preferably be coordinated with the shape of the tabs 17, so that the tabs 17 can be inserted fully into the locking depressions 19.

In the second embodiment of the cover 4a, as shown in FIGS. 6–9, between two neighboring peripheral notches 18a, there can preferably be two locking depressions 19a, 19b preferably offset from one another by an angle. The number of locking depressions present can preferably be at least twice as great as the number of tabs 17 of the base body 3. As shown by a comparison of FIGS. 4 and 6, in this second embodiment, the peripheral notches 18a can be smaller than the peripheral notches 18 in the cover 4, illustrated in FIG. 4. But in any case, the number of locking depressions 19a, 19b should essentially represent a whole-number multiple of the peripheral notches 18a.

Figure 7:
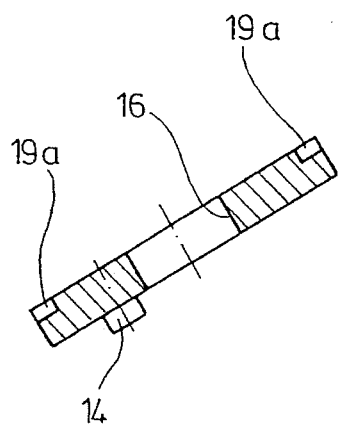
FIGS. 7, 8 and 9 are sections along Lines VII—VII, VIII—VIII and IX—IX respectively, of FIG. 6.
Figure 6:
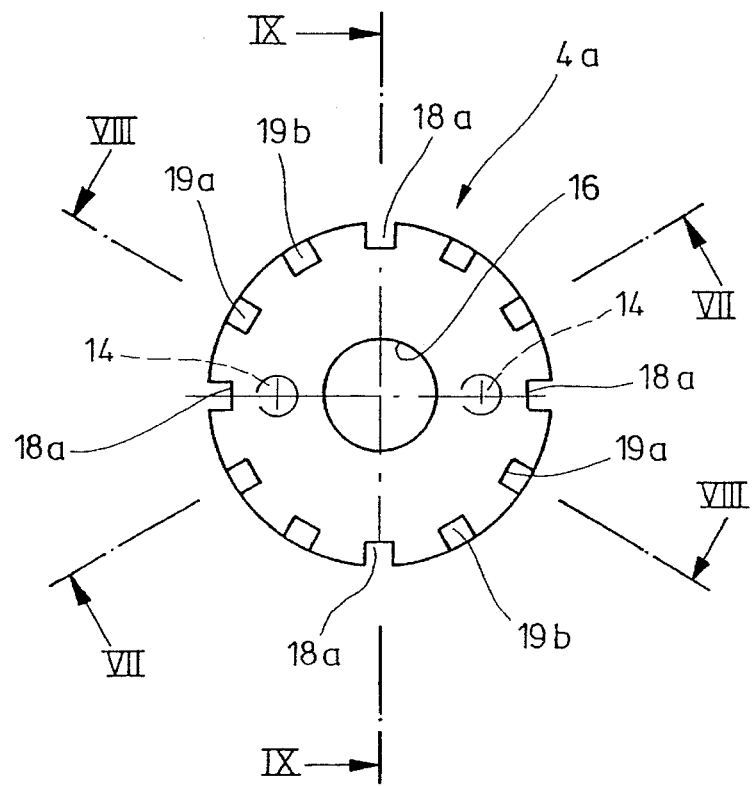
FIG. 6 illustrates a second embodiment of the cover in a representation analogous to FIG. 4.
Figure 9:
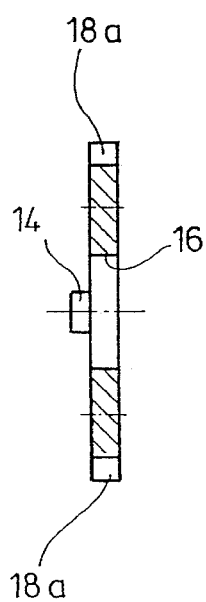
Figure 8:
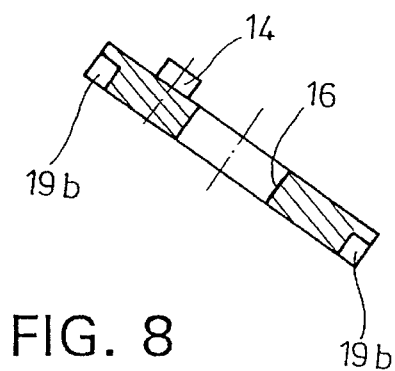

As illustrated in FIGS. 7 and 8, the locking depressions 19b can preferably be deeper than the locking depressions 19a, which means that when the tabs 17 are inserted in the locking depressions 19b, the cover 4 would be pushed farther outward than if the tabs 17 were inserted in the depressions 19a. That essentially means that the spring tension would be greater if the tabs 17 were engaged in the locking depressions 19a than in the locking depressions 19b. On the other hand, with such a configuration, the spring tension can be easily and quickly changed without the need for special tools, and the torque to be transmitted can thereby be easily increased or decreased in stages.

In an alternative embodiment, the outer surface of the cup of the base body 3 can be provided with external gear teeth 20 as shown in FIG. 1. The external gear teeth 20 can preferably be configured to match toothing of a toothed belt, shown schematically as 116 in FIG. 10. As such, the wheel 2 can be driven by means of this toothed belt. The driving torque applied by the belt to the wheel 2 is thereby transmitted to the shaft 1 preferably by means of the frictional engagement of the pairs of friction discs 5, 6. The shaft 1 can support a spool (not shown) on which a ribbon, in particular a thermal transfer ribbon, can be wound. This ribbon can be unwound from another spool or a cassette and thereby be guided over a printing roller. If for any reason the spool from which the ribbon is being unwound should suddenly stop moving, the ribbon must not tear. Such tearing can essentially be prevented by means of the slip clutch claimed by the present invention and installed on the shaft 1.

On one end of the external gear teeth 20, as illustrated in FIG. 1, there can preferably be an external collar 21. This collar 21 can prevent the above-mentioned drive belt from running off center, or sliding off of the wheel 2. In a manner not illustrated, there can of course be such an external collar on both ends of the external gear teeth, so that a sort of pulley headwheel can be formed.

Figure 10:
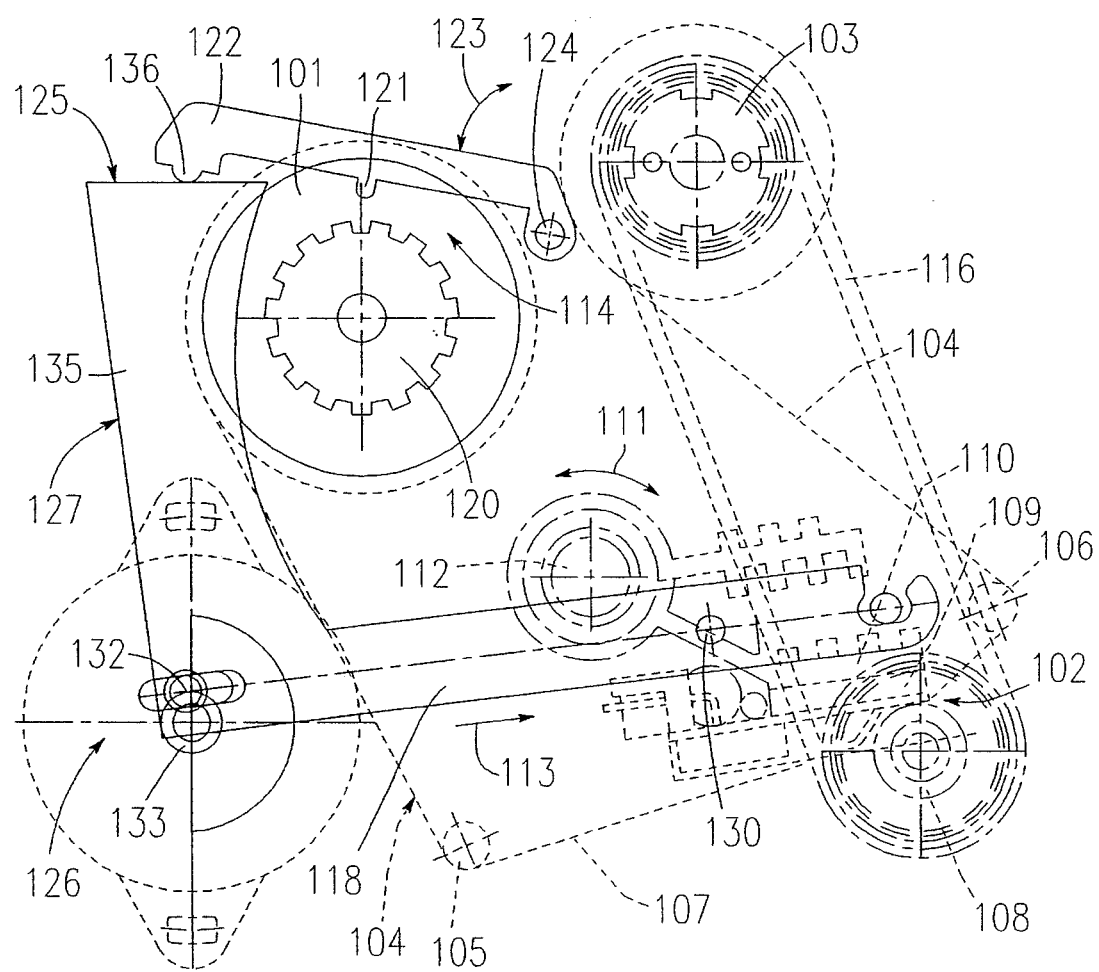
FIGS. 10 and 11 show the positioning of such a clutch in a printer.
Figure 11:
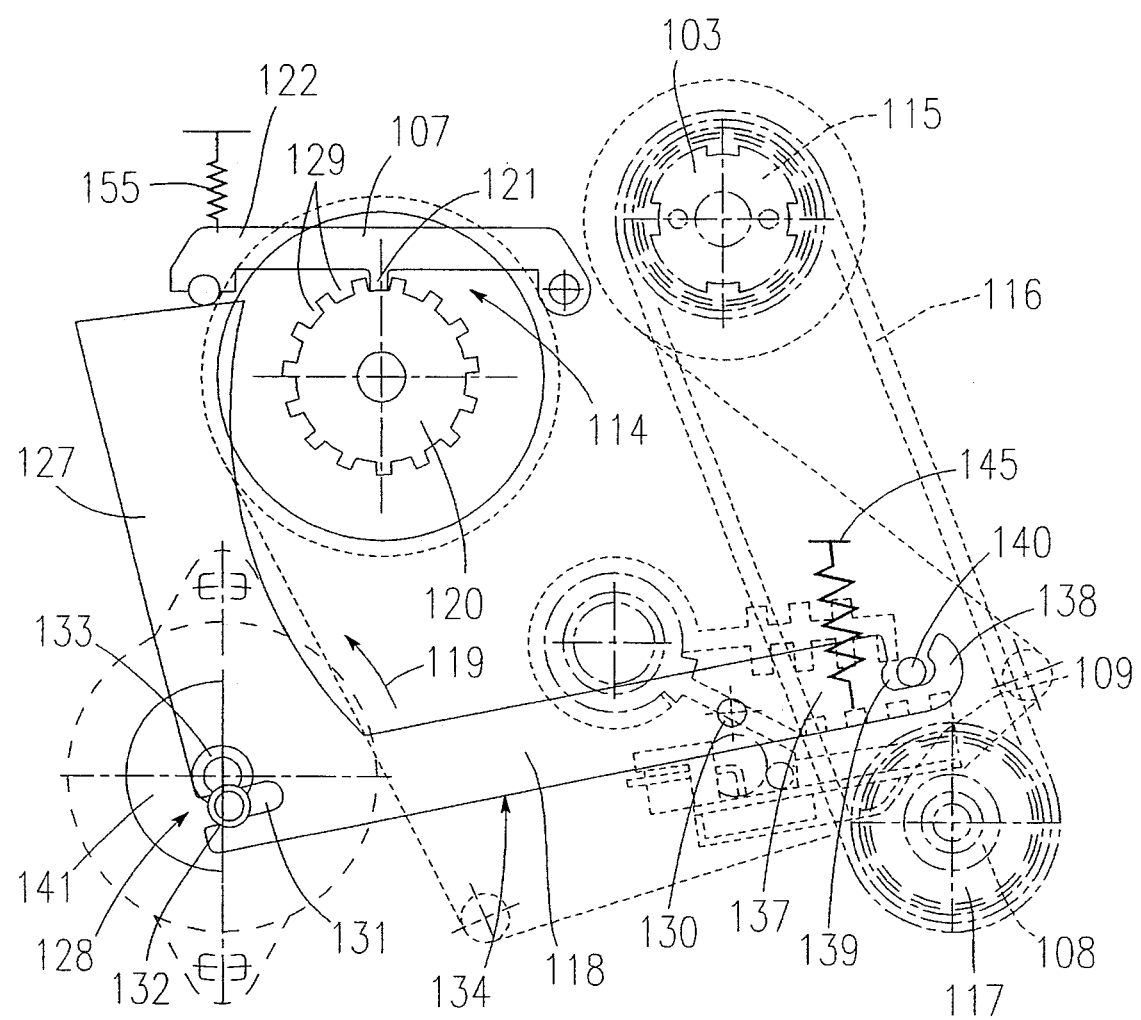

As shown generally in FIGS. 10 and 11, a printer for printing labels can generally have a printing area 102. One such type of printer can include a thermal transfer printer, further detailed herebelow with reference to FIG. 12. In a printer, or thermal transfer printer, an ink ribbon, or thermal transfer ribbon 104 can be unwound from a first spool 101, can be guided through the printing area 102, and can then be wound up on a second spool 103, which could alternately be termed a "take-up spool". The two spools 101 and 103, are preferably located in an ink ribbon cassette. In addition to the spools 101 and 103, guide rollers 105 and 106 can also preferably be a part of the ink ribbon cassette.

A portion of the thermal transfer ribbon 104 which extends between the guide rollers 105 and 106 can essentially be termed an active strand 107 of the ribbon 104. In the depicted embodiment, this active strand 107 is preferably guided by means of a counterpressure roller 108 on the printer. Between the thermal transfer ribbon 104 and the counterpressure roller 108, a medium to be printed can preferably be guided. Such a printing medium, can, for example, include a backing strip which carries labels to be printed. During printing, a thermal print head 109 would typically be disposed in contact with the moving, working strand 107 of the thermal transfer ribbon 104 and, with the interposition of the above-mentioned medium to be printed, preferably presses the thermal transfer ribbon 104 and printing medium firmly against the counterpressure roller 108.

The application force for pressing the thermal transfer ribbon 104 and printing medium firmly against the counterpressure roller 108 can be applied by a biasing device, such as, for example, a coil compression spring 145. This coil compression spring 145 pushes on a pivoting arm 110. The pivoting arm 110 supports the thermal print head 109. The above-mentioned arm 110 which is pushed down by the coil compression spring can pivot around the axis 112 in the direction indicated by the double arrow 111.

The medium to be printed can also be unwound from a roll or spool and can be wound up, if necessary, on another roll or spool. The medium to be printed can typically be divided into individual fields to be printed, or the medium can also contain labels, for example, which do not need to be printed all the way to their front and rear edges. To this extent, therefore, there can typically be spaces which remain unprinted between succeeding, identical printed segments in the direction of transport 113 of the ribbon 104 and of the medium being printed.

In the unprinted sections of the medium being printed, that is, when no printing is being done, a continual advancement of the thermal transfer ribbon 104 would represent an unjustified expense. In other words, with a continual advancement of the thermal transfer ribbon 104 during periods when no printing is being performed, there would typically be portions of the thermal transfer ribbon 104 which would not have therefore been used, thus resulting in wasted ribbon 104. The present invention teaches that unnecessary consumption of the thermal transfer ribbon can be reduced, or even possibly eliminated, by stopping advance of the thermal transfer ribbon 4 Whenever the medium to be printed, which is in constant motion, does not need to be printed at a given point.

A comparatively sudden stopping of the thermal transfer ribbon 104 after printing the "last line" can be accomplished by means of a stopping device 114. In general, to print in a thermal transfer process, the printer basically requires a corresponding electronic control system with a computer. Because such a control system would essentially already have access to all the necessary data regarding the stopping and starting of printing, the existing control system can preferably also be used to control the stopping device 114. In other words, the existing control system could preferably be used to move the stopping device 114 into the operating position when the thermal transfer ribbon 104 need not advance, and to release the stopping device 114 once again when the medium to be printed has advanced to the point where the next area to be printed has arrived in the printing area 102.

The stopping device 114 can preferably also operate in conjunction with a slip clutch 115, as described hereabove with regards to FIGS. 1–9. In the illustrated embodiment of FIG. 11, the driving side of the slip clutch 115 is preferably driven by means of an endless drive element 116, e.g. a toothed belt, and by an electric motor 117. Because of the presence of the slip clutch, during a printing job, the electric motor 117 can essentially always remain turned on, so that the driving side of the slip clutch 115 is in constant rotation. The slip clutch 115 transmits the torque from its driving side to its driven side, on which the second spool 103 would generally be located. If the stopping device 114, however, or some other occurrence, such as jamming, were to abruptly interrupt the movement of the ribbon 104, the friction moment of the slip clutch 115 would no longer suffice to transmit the driving force of the electric motor 117 to the driven side of the slip clutch 115, and the slip clutch 115 would consequently slip. Then, as soon as the stopping device 114, once again releases the first spool 101, the driven side of the slip clutch 115 could also move, and consequently the thermal transfer ribbon 104, unwound from the first spool 101, could be wound up again on the second spool 103.

For various reasons, one of which is to at least prevent a tearing of the thermal transfer ribbon 104 when it is stationary, during these stationary phases, the application pressure with which the thermal print head 109 is pressed against the counterpressure roller 108 should also preferably be overcome. This can be done in a simple manner, e.g. by pivoting an actuation element 118 at the appropriate time, in the direction indicated by the arrow 119, under the control of the printer control system. The actuation element 118 can be connected in a manner not shown in any further detail to the pivoting arm 110, and consequently can drive the arm 110 in the same direction of rotation, whereupon the thermal print head can be raised from the counterpressure roller 108.

In purely theoretical terms, of course, the counterpressure roller 108 could also be lowered away from the print head 109, but the first alternative is preferable for a variety of reasons. As discussed earlier, since the print head 109 is biased towards the counterpressure roller 108, a movement of the print head 109 against the biasing force would immediately neutralize the biasing force, while a movement of the counterpressure roller 108 away from the print head would only gradually decrease the application force over a distance. On the other hand, if the counterpressure roller 108 was being biased into engagement with the print head 109, a preferred movement of the counterpressure roller 108 might be desirable.

The first spool 101 can preferably be non-rotationally connected to an externally-toothed wheel 120. Above the wheel 120, in the plane of the depicted embodiment, a locking tooth 121 can be provided for engaging with the teeth of the toothed wheel 120. The locking tooth 121 can be held by a pivoting arm 122 and can preferably be manufactured as one piece with the pivoting arm 122. The pivoting arm 122 can preferably be pivoted around an axis 124 in the direction indicated by the double arrow 123, or that is, towards and away from the toothed wheel 120. During printing, the pivoting arm 122 would typically be in the angular position indicated in FIG. 10, that is, an unengaged position with respect to the toothed wheel 120. The arm 122 can preferably be retained in this inactive position by means of a holding device, such as a regulatable locking element 125. By means of a drive mechanism 126, which can preferably be controlled by the control system of the printer, the pivoting arm 122 can be moved into the active position shown in FIG. 11.

In the illustrated embodiment, this movement preferably takes place indirectly, i.e. the locking element 125 is located on a lever 127, which lever 127 is mounted so that it can pivot, and which lever 127 can be adjusted by means of a cam drive mechanism 128 (see FIG. 11), which cam drive mechanism 128 can be moved by the drive mechanism 126. The lever 127 is preferably an angular lever having legs 134 (shown in FIG. 11) and 135 (shown in FIG. 10). The upper end of leg 135, in the drawing, forms the locking element 125. As soon as this upper end is lowered, the pivoting arm 122 follows this movement, and the locking tooth 121 can thereby be engaged in the next tooth space 129, as shown in FIG. 11. The pivoting arm can preferably follow the downward movement of the lever 127 due to gravity, however, if alternative positioning of the printing arrangement is desired, a biasing device 155 could preferably be provided to bias the arm 122 towards the toothed wheel 120.

The lever 127 can rotate around an axis 130. In the vicinity of the angle corner of the lever 127, that is, in the vicinity of the drive 126, there can preferably be an open-edged slot 131 in which a pin 132 can be engaged. Both the slot 131 and the pin 132 are components of a cam drive mechanism 128. The pin 132 can preferably be attached to a drivable rotational element 133. This rotational element 133, in accordance with one embodiment of the present invention can preferably execute only approximately one-half of a revolution to move the pin 132 through an arc of about 180 degrees, and thereby move the lever 127. Thus, in accordance with the depicted embodiment, to lower the lever 127 from the position shown in FIG. 10 to the position shown in FIG. 11, the rotational element 133 can be rotated 180 degrees in a first direction which could be either a clockwise or counterclockwise direction. Then to move the lever 127 back into its raised position, the rotational element could be moved in a reverse direction 180 degrees. Alternatively, a raising movement could be brought about by a further 180 degree movement in the first direction. Thus, a reversing motor could be used as the drive 126 to provide a clockwise-counterclockwise movement as discussed above. Alternatively, a one-directional motor could be used as the drive 126 to provide only one of: a clockwise movement, or a counterclockwise movement, that is, provided that the slot 131 could accommodate the pin 132 throughout the full circumferential motion of the pin 132.

The slot 131, as shown in FIG. 11 for example, can preferably extend approximately in the longitudinal direction of the leg 134 of the angular lever 127 hinged at the axis 130. Consequently, the locking element 125 can preferably be located on the free leg 135 (see FIG. 10). The pivoting arm 122, with the locking tooth 121, as shown in the illustrated embodiment, can preferably be a simple pivoting lever which has a projection, such as a preferably convex support element 136, on its free end. This support element 136 can preferably be in contact on top with the end surface of the free leg 135 which forms the locking element 125.

As shown in FIG. 11, the hinged leg 134 of the pivoting angular lever 127 can preferably extend beyond the axis 130. The extending arm which is thereby formed is designated by 137. This arm 137 can preferably be hook-shaped on its free end, and the hook 138 can essentially be formed by a slot 139 which can be open on the side. A bolt 140, which can be fastened to the pivoting arm 110 can be engaged in this slot 139. The pivoting arm 110 can in turn preferably be engaged to the print head 109. It could also be conceivable that a direct connection between the print head 109 and the end 137 of the lever 127 could be provided.

When the rotational element 133 with the pin 132, starting from its angular position illustrated in FIG. 10, is rotated by approximately 180 degrees, e.g. in a counterclockwise direction, the pin 132, which is engaged in the slot 131, can pivot the lever 127 also in the counterclockwise direction around its axis of rotation 130. As a result, on one hand by means of the connection 139, 140, the thermal print head 109 can be raised from the counterpressure roller 108 and the pressure on the medium to be printed and the thermal transfer ribbon 104 in the printing area 102 can be neutralized. In addition, the locking element 125 can be lowered, whereupon the pivoting arm 122 can execute a pivoting motion in the direction indicated by the arrow 123. Thus, while the pressure is being released there can be an essentially simultaneous engagement of the locking tooth 132 in a next available tooth space 129, as shown in FIG. 11. The stopping of the thermal printing ribbon 104 is therefore basically accompanied by the elimination of the pressure on the print head 109 in the printing area 102.

The control for the 180 degree rotational movement can be achieved by means of a control cam 141, which can preferably be non-rotationally connected to the rotational element 133, see FIG. 10, and a sensor, e.g. a sensor which could possibly operate on an optical principle, which can sense the two radial edges of the control cam 141. In this area, therefore, there is a corresponding control unit for the drive motor 126 of the rotational element 133. In other words, a sensor can preferably be provided for indicating when the cam 141 has attained a 180 degree rotation to thereby stop movement of the cam 141 and the lever 127.

Figure 12:
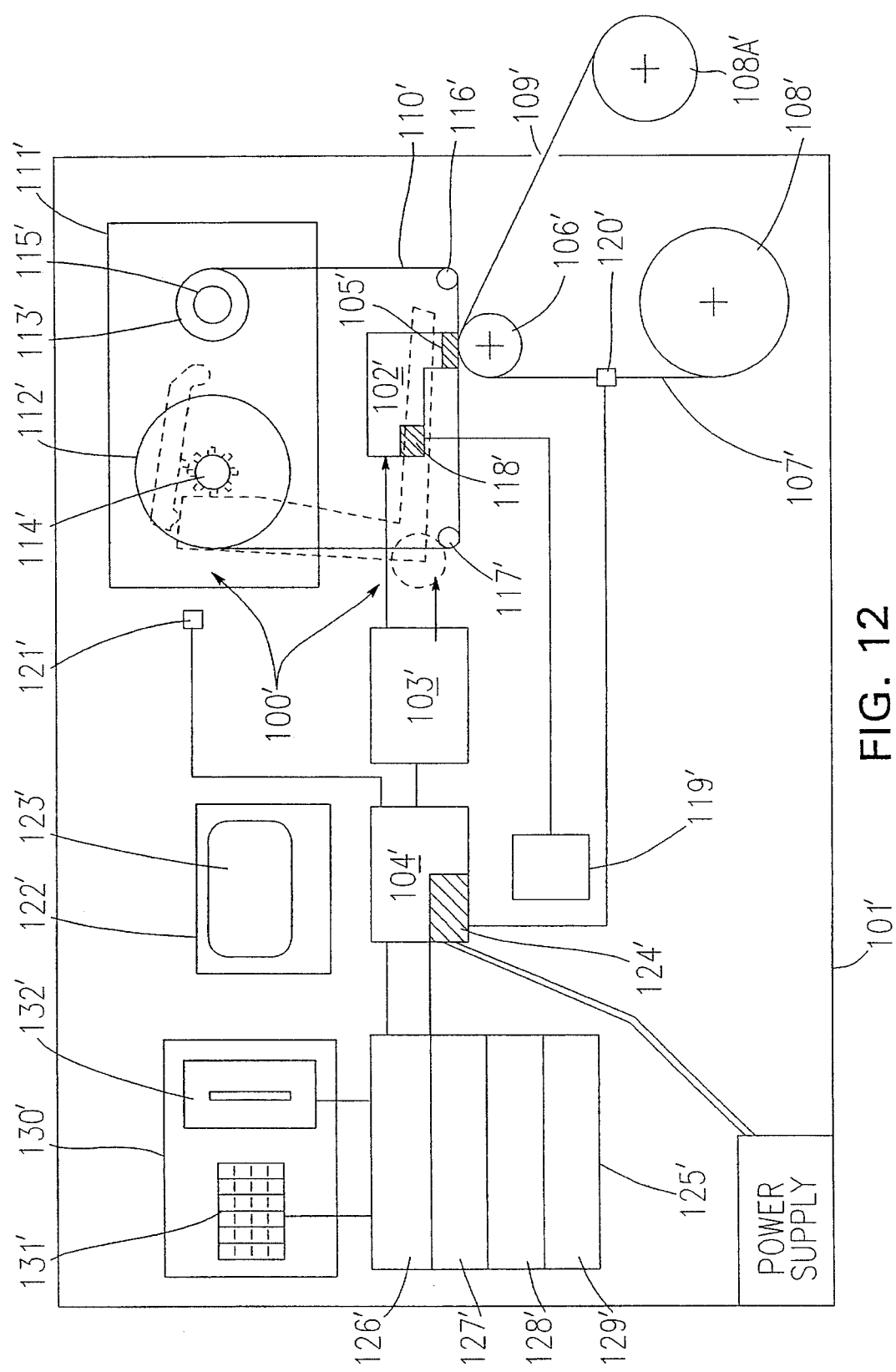
FIG. 12 generally depicts an overall construction of a printer in which the friction clutch of the present invention could be used.

One type of thermal printer which could be configured with the stopping and lifting arrangement in accordance with the present invention is depicted in FIG. 12. In FIG. 12, the stopping and lifting arrangement is schematically represented by the reference number 100'. The thermal printer 101' has a thermal print head 102' which can be electrically connected by means of a control circuit 103' to a computer processor 104'. On the underside of the thermal print head 102' there are preferably electrically activated heating elements 105', which can be maintained in contact against a counterpressure roller 106'. Preferably, the heating elements 105' can be oriented in a straight line lying perpendicular to the plane of the drawing and aligned with a longitudinal axis of the counterpressure roller 106'.

A label strip 107' can be introduced between the heating elements 105' and the counterpressure roller 106'. As the label strip 107' is printed, it is preferably unrolled by means of a label strip payoff reel 108', and can, if desired, be taken up by a take-up reel 108A'. After having been printed with the desired printing information, the label strip 107' can be output by means of an outlet opening 109' of the thermal printer 101'. The above described thermal printer apparatus, including the print head 102', the heating elements 105' and the label strips 107', are generally known in the art and are not described in great detail herein.

The label strip 107' can consist of temperature-sensitive paper which is printed as it is moved past the pin-shaped heating elements 105'. Appropriate ones of the heating elements 105' can be heated as necessary, and the areas of the paper to which heat is applied can thereby be darkened at the desired points. Alternatively, the label strip 107' can also be conventional writing paper. With such conventional writing paper, it is generally necessary to introduce a thermal transfer ink ribbon 110' between the label strip 107' and the heating elements 105' of the thermal print head 102'. The thermal transfer ink ribbon 110' can essentially be coated with temperature sensitive ink, which can preferably be configured to melt at the points where it is moved past activated, or heated, heating elements 105'. The melted ink then can adhere to the conventional label strip 107' to thereby form a desired printed image.

Such a thermal transfer ink ribbon 110' can preferably be housed in a cassette 111', which cassette 111' can preferably have a payoff reel 112' and a take-up reel 113' therein. The cassette 111' can generally be positioned within the thermal printer 101' by means of devices 114', 115' which are configured to fit into, or hold the reels 112', 113'. The thermal printer can also preferably have deflector rollers 116', and 117' disposed within the printer housing, to direct the path of the ink transfer ribbon 110' past the print head 102' and heating elements 105'. Such deflector rolls 116', 117' essentially make certain that the thermal transfer ink ribbon 110' is moved past the heating elements 105' at the optimum angle for transferring the ink to the paper in which it is in contact at the print head 105'. Such thermal transfer ink ribbons, and the manner of transferring the ink thereon, are also considered to be well known in the art.

The thermal print head 102' can be equipped with a temperature sensor 118' to transmit an analog electrical signal corresponding to the temperature of the thermal print head 102' to an analog-digital (A-D) converter 119'. This A-D converter can then digitize the temperature signal and transmit the digitized signal to the processor 104'.

The processor 104' can also preferably be connected to a paper sensor 120', which can be, for example, a photoelectric cell which detects the presence of a label strip 107', and reports the presence or absence of a strip to the processor 104'. Alternatively, the paper sensor 120' can also be configured as a laser scanner which is capable of reading bar codes. If such a scanner were to be used, bar code markings, indicative of the type of paper being used, could be provided on the paper strips. The bar code markings on the label strip 107' could then be automatically read by the scanner to provide the processor 104' with information not only about the presence of the label strip material, but also about the type of label strip material present. These data can be retrieved by the processor 104' for further processing.

The processor 104' can also preferably be electrically connected to an ink ribbon sensor 121'. This ink ribbon sensor 121' can be designed either as a photoelectric cell, only to detect the presence of the thermal transfer ink ribbon 110', or, as discussed above for the paper sensor, can be designed as a laser scanner which can read the bar codes applied to the cassette 111', to thereby provide information on the material, or type of thermal transfer ink ribbon 110' being used. Photoelectric cells and laser scanners are essentially well known, and are therefore not described in any further detail herein.

Other types of sensors or scanners, within the skill of the artisan could also be used for detecting the paper or ink ribbon, or alternately scanning information provided on the paper or ink ribbon.

In order to make the thermal printer more "user-friendly", the processor 104' can preferably be connected to an optical data output medium 122'. Such an output device 122' could provide an LCD screen 123' for displaying variables which the operator may have to adjust, or to alternately display control commands for operation of the printer. Various alternative output devices would also be within the skill of the artisan.

The processor 104' can also preferably be equipped with a working memory 124', the capacity of which is preferably sufficient to buffer the control data supplied both by the read/write memory 125' connected to the processor 104', and also by the paper sensor 120' and by the ink ribbon sensor 121' during a printing process. The processor 104' can preferably use this information to control the label printer 101'. With such a buffer, or working memory 124', the processor could essentially operate at higher speeds as data transfer between the read/write memory 125' and the processor 104' would not need to continuously take place.

The read/write memory 125' can essentially be partitioned into several areas depending on the features of the thermal printer. For example, the memory areas could be set up as provided below, but the following is meant as an example only, and various other set-ups would be well within the skill of the artisan.

A first memory area 126', could be used to store the information which is to be applied, or printed on the labels. A second memory area 127' could be used to store a data matrix corresponding to the various types of paper which are useable for the label strips 107'. A third memory 128' could be used to store the printing speed, that can be set or selected by the operator, and a fourth memory area 129' could be used to store the ink ribbon data corresponding to the various types of paper of the specified label strip 107'.

The number of data matrices stored in the second memory area 127' should preferably correspond to the number of types of paper of the label strips 107' which are specified for use on the particular printer. Each of these data matrices is indicative of the type of paper it describes, and can, for example, consist of an array of three rows of data, whereby the data in the first row could indicate the thermal print head temperatures, the data in the second row could indicate the printing speeds, and the data in the third row could indicate reference energy values. During printing, these reference energy values can be transmitted by the processor 104' preferably directly to the control circuit 103' to control the thermal energies to be generated by the thermal print head 102' in each of the individual heating elements 105' to thereby produce an optimized print. For each data pair consisting of a thermal print head temperature and a printing speed, there is preferably a corresponding reference energy value for the paper being printed upon. Thus, when a temperature and a speed value are input, a reference energy value can clearly be determined and output.

The ink ribbon data contained in the fourth memory area 129' could essentially be described as a list consisting of three rows. The data in the first row could indicate the type of paper of the label strip 107' to be used. The data in the second row could have the values 0 and 1, whereby a "0" can means that when the type of paper listed in the first row is being used for printing, no thermal transfer ink ribbon is necessary, and a "1" could indicate that an ink ribbon is necessary for printing. In the third row, there can either be a "0", which can indicate that when a particular type of paper is used, no special requirements need to be set for the material of the thermal transfer ink ribbon 110', or another digit, i.e., 1, 2, 3, etc. could indicate which type of ink ribbon must be used to print the specific type of paper.

The above described data arrays can preferably be read into the read/write memory 125' by means of a data input device 130'. Such an input device 130' could essentially be a computer keyboard 131' and a card reader device 132', or in essence could essentially be any type of input mechanism which are commonly used for entering data values into computers, i.e. a scanner.

During the installation of the thermal printer, the data matrices corresponding to the types of paper to be used can be read into the corresponding memory area, or in this example, the second memory area 127'. Likewise, the ink ribbon data can be read into its corresponding memory area, or the fourth memory area 129' of the read/write memory 125'. Then, when printing is to be done, the data to be printed on the label strip 107' can be input into its corresponding memory area, or the first memory area 126' by means of the input device 130', or computer keyboard 131' and the card reader 132'.

The processor 104', via the LCD screen 123', can then preferably output a list of the types of paper that were read into the second memory area 127'. The operator can then manually select the data matrix corresponding to the type of paper to be used. Further, the printer may also be set up so that the operator is given an opportunity to verify whether there is a data matrix already stored for the particular type of paper of the label strip 107'. Thus, if necessary, the appropriate data matrix can then be read into the corresponding memory area, or second memory area 127' of the read/write memory 125'. Alternatively, a label strip 107' of a paper with a data matrix already stored in the memory and displayed on the LCD screen 123' can be introduced into the thermal printer 101'.

The processor 104' can then retrieve the data matrix corresponding to the type of paper selected, and can call up the corresponding ink ribbon data from the read/write memory 125', and store these data in its working memory 124'.

By means of the LCD screen 123', the processor 104' can output a list of the possible printing speeds contained in the data matrix, and thus enable the operator to select a desired printing speed. If the operator does not select a speed, the processor can automatically default to a predetermined printer speed, which can be, for example, the maximum possible printing speed of the printer. Alternately, if it is known that operation at the maximum speed is not desired, alternative default speeds, such as 50% or 75% of the maximum speed could be entered as the default speed if so desired.

The above described thermal printer 101', thereby provides an opportunity at the beginning of the printing process to select a printing speed, which printing speed can then be stored in the third memory area 128' of the read/write memory 125'. After the selected data matrix has been read into the working memory 124', the processor 104' can preferably retrieve the value corresponding to the desired printing speed from the third memory area 128', and compare this value to the speed values contained in the data matrix. The processor 104' can then preferably automatically select the value from the data matrix which either corresponds to, or is closest to the selected printing speed.

By means of the temperature sensor 118', the processor 104' can measure the temperature of the thermal print head 102' and then select, from the data matrix, the temperature value corresponding to, or closest to this value.

From the data matrix, and using the above-chosen temperature and speed values, the processor 104' can then preferably select the reference energy value which is specified for the measured value of the thermal print head temperature and the selected or specified printing speed.

In addition to the above-determinations, the processor can also proceed with determining whether or not an ink ribbon is needed, or what type of ribbon is needed. On the basis of the ink ribbon data read into the working memory 124' and specific to the type of paper, and on the basis of the data supplied by the ink ribbon sensor 121', the processor 104' can then check for the following conditions:

A) whether there is a "1" in the second row of the ink ribbon data (indicating that an ink ribbon is needed), and whether a cassette 111' for the thermal transfer ink ribbon 110' has been inserted; or B) whether there is a "0" in this position and no cassette 111' has been inserted.

If the requirements indicated above are not fulfilled, the processor can be set up to indicate such to the operator by means of an error message, either a visible, or audible warning. The error message could also contain information as to how to correct the problem, for example, either to remove the wrong cassette 111' which has been inserted, or to insert the missing cassette 111'.

The processor 104' can also check to see whether there is a "0" in the third row of the ink ribbon data list, or possibly another digit identifying a thermal transfer ink ribbon 110'. On the basis of this value and the values supplied by the ink ribbon sensor 121', the processor 104' can check, if necessary, to see whether the correct thermal transfer ink ribbon 110' has been inserted. By means of an error message displayed on the LCD screen 123', or possibly by an audible warning, the operator can preferably be requested to insert the correct thermal transfer ink ribbon 110' into the printer, if necessary.

Also, on the basis of the data supplied by the paper sensor 120', the processor 104' can preferably check to see whether a label strip 107' has been inserted. A warning signal can also be generated if a paper strip is not present, indicating to the operator that paper needs to be inserted.

The processor 104' can then retrieve the printing information read into the first memory area 126' of the read/write memory 125', and initiate the printing process. To initiate the printing process, the processor 104' will essentially transmit the printing information, the selected or specified printing speed, and the reference energy value selected from the data matrix to the control circuit 103' of the thermal print head 102'. The control circuit 103', by means of electrical connections and driver circuits (not shown, but commonly known in the art), can then drive the counterpressure roller 106' to transport the label strip 107', as well as the thermal transfer ink ribbon 110', preferably by means of electric motors, not shown in the figure. The motor for driving the ink ribbon 110' would preferably be connected to the take-up reel 113'. The control circuit 103' can also preferably start the printing process itself by activating the individual heating elements 105' as a function of the input and measured data.

The reference energy value determined from the printing speed and the thermal print head temperature essentially then controls the thermal energy generated by the heating elements 105'. The thermal energy generated would preferably be greater, the higher the printing speed set, and the lower the measured thermal print head temperature. Preferably, the thermal energy can be controlled by changing the times at which a specified voltage is applied to the heating elements. Such heating elements are preferably designed as resistance heating elements.

If the paper sensor 120' is configured as a laser scanner capable of reading bar codes, and if markings are applied to the labels in the form of bar codes which provide information on the type of paper used for the labels, the operation of the thermal printer 101' can essentially be automated because the type of paper for the labels need no longer be input manually by the operator, but the processor 104', by means of the paper sensor 120', can automatically identify which type of labels have been inserted. On the basis of the data received in this manner, the processor 104' retrieves the corresponding data matrix from the second memory area 127' of the read/write memory 125', and the ink ribbon data specified for the type of paper identified from the fourth memory area 129'. Using these data, the thermal printer 101' can be controlled by the processor 104' as described above.

One feature of the invention resides broadly in a printer with a spring-loaded print head 109 which can be pressed against a counterpressure roller 108, where the active strand 107 of a printing ribbon 104 and a medium to be printed run between the print head 109 and the counterpressure roller 108, whereby the printing ribbon 104 is unwound from a first spool 101 and is wound up on a second spool 103, and between a drive 117 and the second spool 103 and/or between a drive 117 and a drive roller in contact with the medium to be printed there is a slip clutch 115 which is located in a wheel 2 with a concentric shaft 1, to which a torque is transmitted, and whereby between the shaft 1 and the wheel 2 there is at least one pair of axially spring-loaded friction discs 5, 6, characterized by the fact that the wheel 2 is designed as an openable hollow body, that all the elements 5, 6, 7 of the slip clutch 115 are located inside the wheel 2, and that the shaft 1 can be inserted into the slip clutch 115, whereby the at least one shaft-side friction disc 5 can be connected to the shaft 1 in an interlocking manner.

Another feature of the invention resides broadly in the printer, characterized by the fact that for the interlocking connection, the shaft 1 has a non-round cross section, at least in the vicinity of the shaft-side friction disc or discs 5 which can be non-rotationally connected to it, and the locator hole 10 of each shaft-side friction disc 5 matches the cross section of the shaft, in particular segmentally.

Still another feature of the invention resides broadly in the printer, characterized by the fact that each wheel-side friction disc 6 has a central hole 11, the shape of which corresponds to the full cross section of the shaft 1, and that each wheel-side friction disc 6 can be non-rotationally connected by means of at least two peg-hole connections 12, 14 to the hollow body 3, 4, 4a, whereby the longitudinal axes of the pegs run parallel to the longitudinal axis of the shaft.

Yet still another feature of the invention resides broadly in the printer, characterized by the fact that the hollow body consists of an essentially cup-shaped base body 3 and a cover 4, 4a, whereby one wheel-side friction disc 6 is non-rotationally connected to the cup base 22 and the cover 4, 4a, and corresponding to each wheel-side friction disc 6 there is a shaft-side friction disc 5, whereby between the shaft-side friction discs 5 there is a load spring 7 designed as a coil compression spring.

Still another feature of the invention resides broadly in the printer, characterized by the fact that the external surface of the cup of the base body 3 is provided with external gear teeth 20, in which a toothed belt 16 is engaged.

Still yet another feature of the invention resides broadly in the printer, characterized by the fact that the load spring 7 concentrically surrounds a centering bushing 8 through which the shaft 1 can be inserted axially.

Another feature of the invention resides broadly in the printer, characterized by the fact that the cup-shaped base body 3 is detachably connected to the cover 4, 4a by means of a bayonet-like connection.

Still another feature of the invention resides broadly in the printer, characterized by the fact that on the edge of the cup of the base body 3, there are several tabs 17 which are distributed uniformly over the circumference and point radially inward, and the cover 4, 4a, in its peripheral area, has at least a corresponding number of approximately equal-size peripheral notches 18, 18a.

Yet another feature of the invention resides broadly in the printer, characterized by the fact that on the external surface of the cover 4, 4a, between each two peripheral notches 18a, there is at least one locking depression 19, 19a, 19b to hold a tab 17 of the base body.

Still yet another feature of the invention resides broadly in the printer, characterized by the fact that at least two locking depressions 19a, 19b offset at an angle from one another are attached to the cover 4a, whereby the number of locking depressions equals a whole-number multiple of the number of tabs 17 on the base body, and that one group of locking depressions 19a, viewed in the axial direction of the clutch, is lower, or deeper than the other group or groups 19b.

Yet still another feature of the invention resides broadly in the printer, characterized by the fact that the external gear teeth 20 on at least one end are bounded by an external collar 21.

Some examples of printers having printing ribbons, and the components of such printers, which could possibly be used in the context of the present invention, or with the present invention installed therein are disclosed by the following U.S. Pat. No. 5,320,437 to Malke et al., entitled "Printer with a Printer Housing Divided in the Plane of the Print Carrier"; U.S. Pat. No. 5,318,369 to Ishii, entitled "Processing System with Printer Using Exchangeable Ink Ribbon"; U.S. Pat. No. 5,302,041 to Fogle and Huggins entitled "Printer"; U.S. Pat. No. 5,295,753 to Godo and Yamazaki, entitled "Label Tape Printing System Using Thermal Head and Transfer Ink Ribbon"; and U.S. Pat. No. 5,255,012 to Amano, entitled "Thermal Transfer Printer".

Some examples of slip clutches and friction materials which could possibly be used for the friction discs of the present invention are disclosed by the following U.S. Pat. No. 5,265,966 to Schmidt, entitled "Printer Linkage"; U.S. Pat. No. 4,673,304 to Liu and Sholtis, entitled "Thermal Printer Ribbon Cartridge for Wide Ribbons"; U.S. Pat. No. 4,272,202 to Schroeder and Stastny, entitled "Ribbon Cartridge with Broken Unidirectional Friction Drive and Self Cleaning Gears"; U.S. Pat. No. 5,163,541 to Bacon, entitled "Mechanism Useful as a Slip Clutch or Brake"; U.S. Pat. No. 4,545,846 to Lillibridge and Russo, entitled "Envelope Gumbox Friction Brake and Safety Slip Clutch"; and U.S. Pat. No. 3,989,129 to Brandenstein, entitled "Modulated Electric Slip Clutch".

Some examples of ribbon drive systems which could possibly be used in the context of the present invention are disclosed by the following U.S. Pat. No. 5,152,621 to Tsuji, entitled "Film Ribbon Cassette with Mechanism for Preventing Reverse Rotation"; U.S. Pat. No. 4,820,067 to Surti, entitled "Ribbon Cartridge"; and U.S. Pat. No. 4,772,143 to Craft and Molloy, entitled "Reloadable Ribbon Cartridge".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 32 562.9, filed on Sep. 24, 1993, having inventors Peter Schneider and Dirk Umbach, and P 43 32 625.0, filed on Sep. 24, 1993, having inventor Dirk Umbach, and DE-OS P 43 32 562.9 and DE-OS P 43 32 625.0 and DE-PS P 43 32 562.9 and DE-PS P 43 32 625.0, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A printer for printing labels on a label material by transferring a printing substance from a printing ribbon to the label material, said printer comprising:

means for storing label material to be printed upon;

means for storing printing ribbon, the printing ribbon comprising a printing substance thereon;

at least one printing element for transferring the printing substance from the printing ribbon to the label material;

means for feeding the printing ribbon past said at least one printing element;

take-up means for taking-up printing ribbon fed past said at least one printing element;

drive means for driving said take-up means to take-up printing ribbon fed past said at least one printing element;

slip clutch means disposed between said drive means and said take-up means for engaging and disengaging said drive means and said take-up means;

said slip clutch means comprising:
  shaft means, said shaft means comprising means for being connected to one of:
    said drive means, and said take-up means;
  said shaft means being disposed for movement along with said connected one of said drive means and said take-up means;
  housing means disposed about said shaft means, said housing means comprising means for being connected to the other one of:
    said drive means, and said take-up means;
  said housing means being disposed for movement along with said connected other of said drive means and said take-up means;
  said housing means having a first end and a second end, said first and second ends being spaced apart along said axial direction, and said housing means comprising:
    a first end portion disposed at said first end;
    a second end portion disposed at said second end;
    a peripheral wall disposed about said shaft means and extending between said first and second end portions, said first and second end portions and said peripheral wall defining an interior chamber therewithin;
  means for frictionally engaging and disengaging said shaft means with said housing means for moving said shaft means with said housing means during engagement, and interrupting movement of said housing means with said shaft means during disengagement, said means for frictionally engaging and disengaging being disposed within said interior chamber of said housing means; and
  said means for frictionally engaging and disengaging comprising a first friction disc, a second friction disc, a third friction disc and a fourth friction disc, each of said first, second, third and fourth friction discs comprising at least one friction surface comprising a friction material thereon;
  said second friction disc being disposed adjacent said second end portion of said housing means;
  said fourth friction disc being disposed adjacent said first end portion of said housing means;
  said first friction disc being disposed adjacent said second friction disc with said friction surface of said first friction disc disposed in frictional engagement with said friction surface of said second friction disc;
  said third friction disc being disposed adjacent said fourth friction disc with said friction surface of said third friction disc disposed in frictional engagement with said friction surface of said fourth friction disc;
  said first and third friction discs comprise means for non-rotationally connecting said first and third friction discs to said shaft means;
  said second and fourth friction discs comprise means for non-rotationally connecting said second and fourth friction discs to their corresponding adjacent first and second end portions of said housing means; and
  said means for frictionally engaging and disengaging additionally comprising biasing means disposed between said first and third friction discs for biasing said first friction disc into frictional engagement with said second friction disc and biasing said third friction disc into frictional engagement with said fourth friction disc.

2. The printer according to claim 1, further including:

said housing means comprising means for retaining said means for frictionally engaging and disengaging within said interior chamber; and said shaft means being slidably insertable into and slidably removable from both said housing means and said means for frictionally engaging and disengaging retained within said housing means.

3. The printer according to claim 2, wherein:

said shaft means is slidably insertable into and slidably removable from said means for non-rotationally connecting said first and third friction discs to said shaft means; and said friction material comprises a material having a coefficient of friction sufficient for frictionally engaging said first and second friction discs and said third and fourth friction discs to permit rotation of said shaft means with said housing means under a first load applied between said housing means and said shaft means and for disengaging said first and second friction discs and said third and fourth friction discs under a second load applied between said shaft means and said housing means, said second load being greater than said first load.

4. The printer according to claim 3, wherein:

said first and second friction discs, said third and fourth friction discs and said biasing means are completely surrounded by said housing means and form together with said housing means an integral, self-contained unit removable from said shaft means as one piece;

said housing means comprises a substantially hollow, cylindrical-shaped body;

said peripheral wall of said housing means comprises a substantially cylindrical side wall; and at least one of said first end portion and said second end portion of said housing means comprises removable cover means for providing access to said interior space of said housing means.

5. The printer according to claim 4, wherein:

said first and third friction discs each comprise a central hole therein, said central hole having a cross-section, said cross-section being non-round;

said shaft means comprises a non-round cross-section corresponding to said non-round cross-section of said central hole;

said non-round cross-section of said shaft means and said non-round cross-section of said central hole comprising said means for non-rotationally engaging said first and second friction discs and said shaft means;

said second and fourth friction discs comprise a central hole therein, said central hole of said second and fourth friction discs having a cross-section, said cross-section of said central hole of said second and fourth friction discs being configured for rotation of said shaft means therewithin;

both of said second and fourth friction discs further comprise at least one of:
  at least one eccentric hole and at least one excentric shaft,
disposed excentrically to said central hole;
both of said first end portion and said second end portion of said housing means comprise at least one of:
  at least one corresponding excentric shaft and at least one corresponding excentric hole,
for engaging said at least one of said excentric hole and said excentric shaft of its adjacent one of said second and fourth friction discs; and said at least one excentric hole and said at least one excentric shaft comprising said means for non-rotationally engaging said second and fourth friction discs to said first and second end portions of said housing means.

6. The printer according to claim 5, wherein:

said third and fourth friction discs each comprise at least one of said at least one excentric hole, and said first end portion and said second end portion of said housing means each comprise at least one of said at least one excentric shaft;

said housing means comprises a cup-shaped base body forming said side wall and said second end of said housing means, and said first end of said housing means comprises said cover means;

each of said second end of said housing means and said cover means comprise two of said excentric shafts, said two excentric shafts being spaced apart on opposite sides of said central hole;

each of said second and fourth friction discs comprise two of said excentric holes disposed spaced apart about said second and fourth friction discs, said two excentric holes being disposed for engaging with said two excentric shafts of one of said second end and said cover means;

said non-round cross-section comprising a substantially circular portion and a substantially linear portion; and said biasing means comprises spring means disposed between said first and third friction discs.

7. The printer according to claim 6, wherein:

said cylindrical side wall has an exterior surface, said exterior surface comprising a plurality of teeth spaced therearound, said teeth being configured for engaging teeth of a toothed belt;

at least one of said first and second ends of said housing means comprising a radially protruding flange adjacent said teeth of said side wall;

said spring means is disposed concentrically about a bushing, said bushing comprising a bore therethrough for receipt of said shaft means therethrough;

said cover means and said cup-shaped base body comprises a bayonet connection for releasably connecting said cover means to said cup-shaped base body;

said first end of said housing means comprising a plurality of tabs extending radially inwardly from said side wall;

said cover means has a thickness dimension, a first side for being disposed towards the interior of the housing and a second exterior side;

said cover means comprises a plurality of peripheral notches extending through said cover means along said thickness dimension;

said plurality of notches corresponding to said plurality of tabs;

said second side of said cover means comprises, between ones of said notches, peripheral depressions extending only partially through said cover means along said thickness dimension, said peripheral notches being configured for maintaining said cover means on said base body, and for engaging said cover means in a non-rotational manner to said base-body;

said peripheral depressions comprising at least a first set and a second set of peripheral depressions;

said first set of peripheral depressions having a first depth into said cover means;

said second set of peripheral depressions having a second depth into said cover means; and said first depth being less than said second depth to compress said spring means to a greater extent when said tabs engage said first set of peripheral depression than when said tabs engage said second set of peripheral depressions.

8. In a printer for printing on a material by transferring a printing substance from a printing ribbon to the material in a printing area of the printer, means for feeding the printing ribbon through the printing area of the printer, take-up means for taking-up printing ribbon fed through the printing area; drive means for driving said take-up means to take-up the printing ribbon fed through the printing area; slip clutch means disposed between said drive means and said take-up means for engaging and disengaging said drive means with said take-up means, said slip clutch means comprising:

an input member for being connected to one of said drive means and said take-up means;

an output member for being connected to the other of said drive means and said take-up means, said input member and said output member being coaxial and rotatable with respect to one another; and means for engaging and disengaging said input member with said output member for rotating said input member with said output member during engagement, and interrupting rotation of said input member with said output member during disengagement;

one of said coaxial input and output members comprising a housing for being disposed about the other of said coaxial input and output members;

said housing defining an interior chamber therewithin;

said means for engaging and disengaging being disposed within said interior chamber;

said housing comprising means independent of said other of said coaxial input and output members, for retaining said means for engaging and disengaging in said interior chamber and for holding said housing and said means for engaging and disengaging together as an integral, self-contained, unitary unit; and said self-contained unit comprising means for slidably accommodating said other of said coaxial input and output members for permitting insertion and removal of said other of said coaxial input and output members into and out of said self-contained unit.

9. The slip clutch according to claim 8, further including said self-contained unit being slidably insertable onto and slidably removable from said other of said coaxial input and output members as a single piece.

10. The slip clutch according to claim 9, wherein:

said means for engaging and disengaging comprises means for frictionally engaging and disengaging said other of said coaxial input and output members with said housing means;

said means for frictionally engaging and disengaging comprises a first member and a second member;

said first member comprises means for non-rotationally connecting said first member to said other of said coaxial input and output members, said other of said coaxial input and output members being slidably insertable into and slidably removable from said means for non-rotationally connecting;

said second member comprising means for non-rotationally connecting said second member to said housing means;

said first member comprises a first surface disposed towards said second member;

said second member comprises a first surface disposed towards said first member;

said slip clutch further comprises biasing means for biasing said first surface of said first member into frictional engagement with said first surface of said second member; and said first surfaces comprising a friction material having a coefficient of friction sufficient to frictionally engage said first and second members.

11. The slip clutch according to claim 10, wherein:

said first member, said second member and said biasing means are completely surrounded by said housing means;

said housing means comprises a substantially hollow, disc-shaped body;

said housing means comprises a first end, a second end, and a substantially cylindrical side-wall connecting said first end to said second end;

said first end, said second end, and said side wall defining said interior chamber therein;

said first member, said second member and said biasing means are disposed within said interior of said housing means;

at least one of said first end portion and said second end portion of said housing means comprises removable cover means for providing access to said interior of said housing means for disposing said first member, said second member and said biasing means in said interior chamber;

at least one of: said cover means and said side-wall comprises means for retaining said cover means on said housing means;

said means for retaining said means for engaging and disengaging in said interior chamber comprises said cover means retained on said housing means; and said cover means comprises orifice means therein for permitting said other of said coaxial input and output members to be slidably insertable through said cover means and into and out of said means for engaging and disengaging when said cover means is retained on said housing means.

12. The slip clutch according to claim 11, wherein:

said other of said coaxial input and output members comprises shaft means for rotatably receiving said housing means therearound;

said first member comprises a first friction disc and said second member comprises a second friction disc;

said first friction disc comprises a central hole therein, said central hole having a cross-section, said cross-section being non-round;

said shaft means comprises a non-round cross-section corresponding to said non-round cross-section of said central hole;

said non-round cross-section of said shaft means and said non-round cross-section of said central hole comprising said means for non-rotationally engaging said first member and said shaft means;

said second friction disc comprises a central hole therein, said central hole of said second friction disc having a cross-section, said cross-section of said central hole of said second friction disc being configured for rotation of said shaft means therewithin;

said second friction disc further comprising at least one of:
at least one excentric hole and at least one excentric shaft,
disposed excentrically to said central hole;

at least one of said first end portion and said second end portion of said housing means comprises at least one of:
at least one corresponding excentric shaft and at least one corresponding excentric hole, for engaging said at least one of said excentric hole and said excentric shaft of said second friction disc; and said excentric hole and corresponding excentric shaft comprising said means for non-rotationally engaging said second member to said housing means.

13. The slip clutch according to claim 12, wherein:

said friction means further comprises a third friction disc and a fourth friction disc;

said third friction disc being substantially similar to said first friction disc and said fourth friction disc being substantially similar to said second friction disc;

said housing means comprises a cup-shaped base body forming said side wall and said second end of said housing, and said first end of said housing means comprises said cover means;

each of said second end of said housing means and said cover means comprise two of said excentric shafts, said two excentric shafts being spaced apart on opposite sides of said central hole;

each of said second and fourth friction discs comprise two of said excentric holes disposed spaced apart about said friction discs, said two excentric holes of said second and fourth friction discs being disposed for engaging with said two excentric shafts of one of said second end and said cover means;

said non-round cross-section comprising a substantially circular portion and a substantially linear portion;

said second friction disc being disposed adjacent said second end;

said fourth friction disc being disposed adjacent said cover means;

said first friction disc being disposed adjacent said second friction disc;

said third friction disc being disposed adjacent said fourth friction disc; and said biasing means comprising spring means disposed between said first and third friction discs to bias said first friction disc into engagement with said second friction disc and bias said third friction disc into engagement with said fourth friction disc.

14. The slip clutch according to claim 13, wherein:

said cylindrical side wall has an exterior surface, said exterior surface comprising a plurality of teeth spaced therearound, said teeth being configured for engaging teeth of a toothed belt;

at least one of said first and second ends comprising a radially protruding flange adjacent said teeth of said side wall;

said spring means is disposed concentrically about a bushing, said bushing comprising a bore therethrough for receipt of said shaft means therethrough;

said cover means and said cup-shaped base body comprises a bayonet connection for releasably connecting said cover means to said cup-shaped base body;

said first end of said housing means comprising a plurality of tabs extending radially inwardly from said side wall;

said cover means has a thickness dimension, a first side for being disposed towards the interior of said housing means and a second exterior side;

said cover means comprises a plurality of peripheral notches extending through said cover means along said thickness dimension;

said plurality of notches corresponding to said plurality of tabs;

said second side of said cover means comprises, between ones of said notches, peripheral depressions extending only partially through said cover means along said thickness dimension, said peripheral notches being configured for maintaining said cover means on said base body, and for engaging said cover means in a non-rotational manner to said base body;

said peripheral depressions comprising at least a first set and a second set of peripheral depressions;

said first set of peripheral depressions having a first depth into said cover means;

said second set of peripheral depressions having a second depth into said cover means; and said first depth being less than said second depth to compress said spring means to a greater extent when said tabs engage said first set of peripheral depression than when said tabs engage said second set of peripheral depressions.

15. A method of operating a printer for printing on a material by transferring a printing substance from a printing ribbon to the material in a printing area of the printer, the printer comprising: means for feeding the printing ribbon through the printing area of the printer, take-up means for taking-up printing ribbon fed through the printing area; drive means for driving said take-up means to take-up the printing ribbon fed through the printing area; and slip clutch means disposed between said drive means and said take-up means for engaging and disengaging said drive means with said take-up means; said slip clutch means comprising: shaft means, said shaft means comprising means for being connected to one of: said drive means, and said take-up means; said shaft means being disposed for movement along with said connected one of said drive means and said take-up means; housing means disposed about said shaft means, said housing means comprising means for being connected to the other one of: said drive means, and said take-up means; said housing means being disposed for movement along with said connected other of said drive means and said take-up means; means for frictionally engaging and disengaging said shaft means with said housing means for moving said shaft means with said housing means during engagement and interrupting movement of said housing means with said shaft means during disengagement, said housing means defining an interior chamber therein, said means for frictionally engaging and disengaging being disposed within said interior chamber of said housing means; and said housing means surrounding at least a substantial portion of at least said means for frictionally engaging and disengaging, said housing comprising means, independent of said shaft means, for retaining said means for engaging and disengaging in said interior chamber for holding said housing means and said means for engaging and disengaging together as an integral, self-contained unit removable from said shaft means as a single piece; said method comprising the steps of:

providing a printer for printing on a material by transferring a printing substance from a printing ribbon to the material in a printing area of the printer;

providing said means for feeding the printing ribbon through the printing area of the printer;

providing said take-up means for taking-up printing ribbon fed through the printing area;

providing said drive means for driving said take-up means to take-up the printing ribbon fed through the printing area; and providing said slip clutch means between said drive means and said take-up means;

said providing said slip clutch means comprising the steps of:

providing said shaft means as a component of said slip clutch means;

connecting said shaft means to said one of: said drive means, and said take-up means;

disposing said shaft means for movement along with said connected one of said drive means and said take-up means;

providing said housing means as a component of said slip clutch;

providing said means for frictionally engaging and disengaging said shaft means with said housing means;

disposing said means for frictionally engaging and disengaging within said interior chamber of housing means;

surrounding at least a substantial portion of at least said means for frictionally engaging and disengaging with said housing means;

retaining said means for frictionally engaging and disengaging within said housing means to form said integral self-contained unit of said housing means and said means for frictionally engaging and disengaging; and for installing said integral self-contained unit in the printer:

disposing said integral, self-contained unit on said shaft means as a single piece to install said integral self-contained unit in the printer; and for removing said integral self-contained unit from the printer:

removing said integral, self-contained unit from said shaft means as a single piece to remove said integral self-contained unit; and said method further comprising the steps of A, B, C, D, E and F:

A) feeding printing ribbon through the printing area of the printer;

B) frictionally engaging said shaft means with said housing means;

C) driving one of: said shaft means and said housing means to drive the frictionally engaged other of said shaft means and said housing means to take-up ribbon fed through the printing area; and subsequent to steps A, B and C performing the steps of D, E and F:

D) inhibiting feed of printing ribbon through the printing area of the printer;

E) interrupting said frictional engagement between said shaft means and said housing means to relatively rotate said shaft means and said housing means with respect to one another; and F) stopping take-up of ribbon by said take-up means.

16. The method according to claim 15, wherein said shaft means is slidably insertable into and slidably removable from said means for frictionally engaging and disengaging retained in said housing means during installation and removal of said self-contained unit from said printer; and said method of operating a printer further comprises the steps of:

during installation of said self-contained unit, slidably inserting said shaft means through at least a portion of said housing means and into said means for frictionally engaging and disengaging retained in said housing means; and during removal of said self-contained unit, slidably removing said shaft means from said means for frictionally engaging and disengaging retained in said housing means and slidably removing said shaft means out of said at least a portion of said housing means.

17. The method according to claim 16, wherein said means for frictionally engaging and disengaging comprises a first member and a second member, said first member comprising means for non-rotationally connecting said first member to said shaft means, said shaft means being slidably insertable into and slidably removable from said means for non-rotationally connecting, and said second member comprising means for non-rotationally connecting said second member to said housing means; said first member comprises a first surface disposed towards said second member, said second member comprises a first surface disposed towards said first member, said slip clutch further comprises biasing means for biasing said first surface of said first member into frictional engagement with said first surface of said second member: and said first surfaces comprising a friction material having a coefficient of friction sufficient to frictionally engage said first and second members, and said method further comprises:

during assembly of said slip clutch means:

providing said biasing means within said interior chamber of said housing means;

inserting said first and second members into said interior chamber of said housing means;

non-rotationally connecting said second member to said housing means;

retaining said first and second members and said biasing means within said housing means;

slidably inserting said shaft means through said first and second members to rotationally dispose said shaft means within said second member and non-rotationally engage said shaft means with said means for non-rotationally connecting said shaft means with said first member; and biasing said first and second members together with said biasing means for frictionally engaging said first and second members;

driving said shaft means to drive said first member non-rotationally connected to said shaft means, to drive said second member frictionally engaged with said first member to drive said housing means non-rotationally connected to said second member, said housing means having a load for resisting rotation of said housing means;

maintaining said second member in frictional engagement with said first member up to a first resistance load being applied to said housing means;

applying a resistance load to said housing means greater than the first resistance load;

interrupting said frictional engagement between said first and second member at the resistance load greater than said first resistance load to rotationally disengage said first member from said second member; and preventing tearing of printing ribbon being taken up by said take-up means.

18. The method according to claim 17, wherein said housing means comprises a substantially hollow, cylindrical-shaped body, said housing means defines an axial direction and has a first axial end and a second axial end, and said housing means comprises a first end portion disposed at said first end, a second end portion disposed at said second end, and a substantially cylindrical side wall connecting said first end portion to said second end portion; said first end portion, said second end portion, and said side wall defining said interior chamber within said housing means, and said method further comprises:

disposing said first member, said second member and said biasing means within said interior chamber of said housing means to completely surround said first member, said second member and said biasing means by said housing means;

providing removable cover means as at least one of said first end portion and said second end portion of said housing means for providing access to said interior space of said housing means, said cover means comprising an orifice therethrough for providing access to said interior chamber, said shaft means being slidably insertable through said cover means and into engagement with said first member to provide said non-rotational connection with said first member;

retaining said removable cover means on said housing means to retain said first member said second member and said biasing means in said interior chamber and form said integral, self-contained unit.

19. The method according to claim 18, wherein said method further comprises:

providing a first friction disc as said first member and providing a second friction disc as said second member;

providing a non-round central hole in said first friction disc;

configuring said shaft means to comprise a non-round cross-section corresponding to said non-round cross-section of said central hole, said non-round cross-section of said shaft means and said non-round cross-section of said central hole comprising said means for non-rotationally engaging said first member and said shaft means;

providing a central hole in said second friction disc;

said central hole of said first and second friction discs being disposed in alignment with said opening of said cover means for insertion of said shaft means through said cover means and said central holes;

configuring said orifice of said cover means and said central hole of said second friction disc and configuring said shaft means so that said shaft means is rotatable in said central hole of said second friction disc and said orifice of said cover means and so that said shaft means is slidably insertable through said orifice and said central hole of said cover means and into said non-rotatable connection of said first member;

providing at least one of:

at least one excentric hole and at least one excentric shaft, on said second friction disc, excentrically to said central hole of said second friction disc;

providing at least one of said first end and said second end of said housing means with at least the other of:

at least one excentric shaft and at least one excentric hole, for engaging said at least one of said excentric hole and said excentric shaft of said second friction disc to non-rotationally engage said second member to said housing means.

20. The method according to claim 19, further including the steps of:

providing a third friction disc and a fourth friction disc within said housing means;

configuring said third friction disc to be substantially similar to said first friction disc and configuring said fourth friction disc to be substantially similar to said second friction disc;

providing a cup-shaped body to form said side wall and said second end of said housing means, said first end of said housing means comprising said cover means;

providing two of said excentric shafts, spaced apart from one another on opposite sides of said central hole, on each of said second end of said housing means and said cover means;

providing two of said excentric holes disposed spaced apart from one another about each of said second and fourth friction discs;

disposing said second friction disc adjacent said second end;

disposing said fourth friction disc adjacent said cover means;

engaging said two excentric holes of said second and fourth friction discs with said two excentric shafts of said adjacent one of said second end and said cover means;

configuring said non-round cross-section as a substantially circular portion and a substantially linear portion;

disposing said first friction disc adjacent said second friction disc;

disposing said third friction disc adjacent said fourth friction disc;

providing spring means as said biasing means;

disposing said spring means between said first and third friction discs to bias said first friction disc into engagement with said second friction disc and bias said third friction disc into engagement with said fourth friction disc;

providing a plurality of spaced apart teeth about an exterior surface of said cylindrical side wall, said teeth being configured for engaging teeth of a toothed belt;

providing at least one of said first and second ends with a radially protruding flange adjacent said teeth of said side wall;

providing a bushing within said spring means, said bushing comprising a bore therethrough for receipt of said shaft means therethrough;

providing a bayonet connection between said cover means and said cup-shaped base body for releasably connecting said cover means to said cup-shaped base body;

providing a plurality of tabs about said first end of said housing, said tabs extending radially inwardly from said side wall;

providing a plurality of peripheral notches, corresponding to said plurality of tabs, disposed about said cover means and extending through said cover along a thickness dimension of said cover means, said cover means further having a first side for being disposed towards the interior of the housing and a second exterior side;

providing between ones of said notches on said second side of said cover means, peripheral depressions extending only partially through said cover means along said thickness dimension, said peripheral notches being configured for maintaining said cover means on said base body, and for engaging said cover means in a non-rotational manner to said base-body;

providing at least a first set and a second set of said peripheral depressions;

configuring said first set of peripheral depressions to have a first depth into said cover means;

configuring said second set of peripheral depressions to have a second depth into said cover means;

configuring said first depth to be less than said second depth to compress said spring means to a greater extent when said tabs engage said first set of peripheral depression than when said tabs engage said second set of peripheral depressions, and said method further comprises:

inserting said cover means into said housing means by passing said tabs of said housing through said notches of said cover means, and during said inserting, applying a force on said cover means opposite said biasing force of said spring means to compress said spring means;

relatively rotating said cover means and said housing means to align said tabs with one of said first and second sets of radial depressions;

removing the applied force on said cover means to permit said tabs to be biased into said radial depressions; and changing an amount of biasing force applied by said spring means to said friction members by variably engaging said tabs with one of:

said first set of radial depression, and said second set of radial depressions, said changing an amount of biasing force comprising:

applying a force on said cover means opposite said biasing force to disengage said tabs from said radial depressions;

relatively rotating said cover means and said housing means to align said tabs with another set of radial depressions; and removing the applied force on said cover means to permit said tabs to be biased into said radial depressions.

* * * * *

UNITED STATES PATENT AND TRADEMARK OFFICE
CERTIFICATE OF CORRECTION

PATENT NO. : 5,478,159
DATED : December 26, 1995
INVENTOR(S) : Peter SCHNEIDER and Dirk UMBACH It is certified that error appears in the above-indentified patent and that said Letters Patent is hereby corrected as shown below:

On the title page, item [75], after 'Schneider,', delete "NeckargemÜnd;" and insert --Neckargemünd--.

In column 22, line 57, Claim 5, after the first occurrence of 'one', delete "eccentric" and insert --excentric--.

Signed and Sealed this

Fifth Day of November, 1996

BRUCE LEHMAN

*Attest:*

*Attesting Officer*    Commissioner of Patents and Trademarks